(12) United States Patent
Cheung et al.

(10) Patent No.: US 7,523,397 B2
(45) Date of Patent: Apr. 21, 2009

(54) CENTRALIZED ALERT AND NOTIFICATIONS REPOSITORY, MANAGER, AND VIEWER

(75) Inventors: Dennis T. Cheung, Mountain View, CA (US); Daniel W. Crevier, San Jose, CA (US); Omar H. Shahine, San Francisco, CA (US); Sai Wing Yeung, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 10/261,233

(22) Filed: Sep. 30, 2002

(65) Prior Publication Data

US 2004/0061716 A1 Apr. 1, 2004

(51) Int. Cl.
*G06F 3/00* (2006.01)
(52) U.S. Cl. ...................................... 715/710
(58) Field of Classification Search ................. 715/710, 715/711, 802; 709/205, 224
See application file for complete search history.

(56) References Cited

U.S. PATENT DOCUMENTS

| | | | | |
|---|---|---|---|---|
| 5,155,842 A | | 10/1992 | Rubin | ......................... 395/575 |
| 5,283,861 A | * | 2/1994 | Dangler et al. | .............. 715/740 |
| 5,669,005 A | * | 9/1997 | Curbow et al. | .............. 715/234 |
| 5,819,263 A | * | 10/1998 | Bromley et al. | ................. 707/3 |
| 6,275,957 B1 | | 8/2001 | Novik et al. | .................. 714/39 |
| 6,857,017 B1 | * | 2/2005 | Faour et al. | ................. 709/224 |
| 2002/0054117 A1 | * | 5/2002 | van Dantzich et al. | ...... 345/766 |
| 2002/0083136 A1 | * | 6/2002 | Whitten, II | ................. 709/205 |
| 2002/0111971 A1 | * | 8/2002 | Kutcher et al. | .............. 707/520 |

OTHER PUBLICATIONS

"About the Notification Manager" Developer Connection Jun. 17, 2007.*

* cited by examiner

*Primary Examiner*—Boris Pesin
(74) *Attorney, Agent, or Firm*—Workman Nydegger (57) ABSTRACT

A central notifications manager user interface is employed for presenting and managing notifications and alerts received from a plurality of different sources in a consistent and uniform format. The different sources can include one or more business productivity programs, such as a word processor, spreadsheet, presentation manager, or email/personal information manager software application, as well a messaging service that produces alerts transmitted over the Internet. The user can selectively enable the display of pop-up reminders to notify the user when a task becomes due, and can selectively display an entire list of notifications and alerts that are active, enabling the user to manage (i.e., edit) the notifications and alerts within the source application. Pop-up display of notifications is automatically disabled during a presentation to avoid undesired display interruptions.

22 Claims, 8 Drawing Sheets

CENTRALIZED ALERT AND NOTIFICATIONS REPOSITORY, MANAGER, AND VIEWER

FIELD OF THE INVENTION

This invention generally relates to centrally handling notifications and alerts from different sources on a computing device, and more specifically, to creating a central notification user interface used for viewing and managing the notifications and alerts so that they are presented to a user in a consistent and uniform format.

BACKGROUND OF THE INVENTION

A computing device may have several different software applications or services that produce alerts or notifications, which pop-up on a display screen to provide information or a reminder to a user. The alerts can be reminders of scheduled times for appointments or other tasks, as provided by a combined email and personal information manager program, such as Microsoft Corporation's ENTOURAGE™ program for Apple Corporation's MACINTOSH™ Computers. Users can also schedule notifications to follow up on a file in Microsoft Corporation's WORD™, EXCEL™, and POWERPOINT™ programs. Instant messaging programs, such as Microsoft Corporation's MSN MESSENGER™ program, open other types of alerts, such as an alert that a stock price has reached a predefined level or an alert that an accident on a road frequently traveled by the user has caused a traffic delay. Connection of computing devices to the Internet has greatly expanded the range and types of possible notifications and alerts that may be displayed to a user. The form of these alerts or notifications and the manner in which they appear on a user's display screen is generally determined by the designers of the software applications that produce them. It is not surprising that users find the variety and number of notifications and alerts so overwhelming that they may eventually choose to disable all notifications and alerts.

There is clearly a benefit for a user of a computing device to receive information of potential value and to be reminded of the approach of a scheduled time to carry out a task. However, there is a need to better manage the various kinds of notifications and alerts that are presented to a user on a display. It should be possible for a user to centrally access, manage, and view alerts from a variety of different sources, instead of each notification or alert being controlled separately by the application that produced it and each appearing in a different format and in a manner determined by its own set of preferences. Currently, there is no provision in any application or operating system for centrally managing notifications and alerts from different sources in such a uniform manner. By providing a centralized notification manager, users should be able to more efficiently access the information and reminders provided thereby and not be confused by a variety of different formats and functionalities for presenting the notifications and alerts.

SUMMARY OF THE INVENTION

To address the problems created by the notifications and alerts that are produced by different sources, the present invention provides a central repository to receive and temporarily store the notifications and alerts so that they can be viewed and managed by a user as desired. Centrally coordinating and presenting notifications and alerts to a user enables them to be presented in a uniform and consistent format, even though the notifications and alerts originate from any of a plurality of different sources that are independent of each other. A central notification manager user interface is executed in software to implement these tasks. The central notification manager responds to notifications or alerts originating from any of the plurality of different sources. For each notification or alert, an indication is provided to the user in a uniform and consistent format. Using the central notification manager user interface, the user can selectively access details of each notification and alert that has been detected and is still active.

At least a portion of the notifications and alerts are stored in a corresponding database. In an initial preferred embodiment, the plurality of different sources include at least one business productivity software application, such as a word processing program, a spreadsheet program, a program for producing presentations, and an email/personal information management program. The notifications and alerts stored in the notification and alerts database can include a follow-up reminder associated with a file produced using one of these business productivity software application programs, or a reminder to do a task at a specific date and time, or a reminder of an event that occurs at a specific date and time.

There are times when a user will prefer not to be interrupted by a notification or alert. For example, while the user's computing device is being used to display a presentation, it would be inconvenient for reminder of some event to pop-up on the display. Accordingly, the notifications and alerts can be selectively blocked from being displayed to the user while a presentation program is executing on the user's computing device.

At least one source of the notifications and alerts in an initial preferred embodiment is a messaging service, such as Microsoft Corporation's MSN MESSENGER™, which is coupled to the computing device over the Internet, so that notifications and alerts produced by the messaging service are received from a remote site. These notifications and alerts are not stored in the notifications and alerts database, unlike those generated by the business productivity application programs, since the messaging service typically produces notifications and alerts that are relevant or of interest to the user for only a short time.

If the user does not want to see any notifications and alerts, the user can selectively disable the display of notifications and alerts by the central notification manager user interface. However, the central notification manager is preferably started when it becomes necessary to display a notification or an alert to the user. The central notification manager can be minimized to appear as an icon in the dock (or task bar). While the central notification manager is running, the user is provided a count of the notifications and alerts that have been detected and are still active. The count value is decremented if a notification or alert expires, or if the user deletes a notification or alert.

When presented with a notification or alert included in the notification and alert database, the user has the option of selecting a snooze time interval for deferring a further display of a reminder of the notification or alert. Each of the notifications and alerts associated with a specific date and time includes a status that is displayed in the central notification manager user interface. The status indicates whether the specific date and time has already passed, and whether some action that was scheduled to be done is overdue or completed.

Other aspects of the present invention are directed at a memory medium for storing machine instructions that carry out functions generally consistent with the steps of the method discussed above, and to a system in which a processor executes machine instructions stored in a memory to implement functions that are also generally consistent with the above described steps of the method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
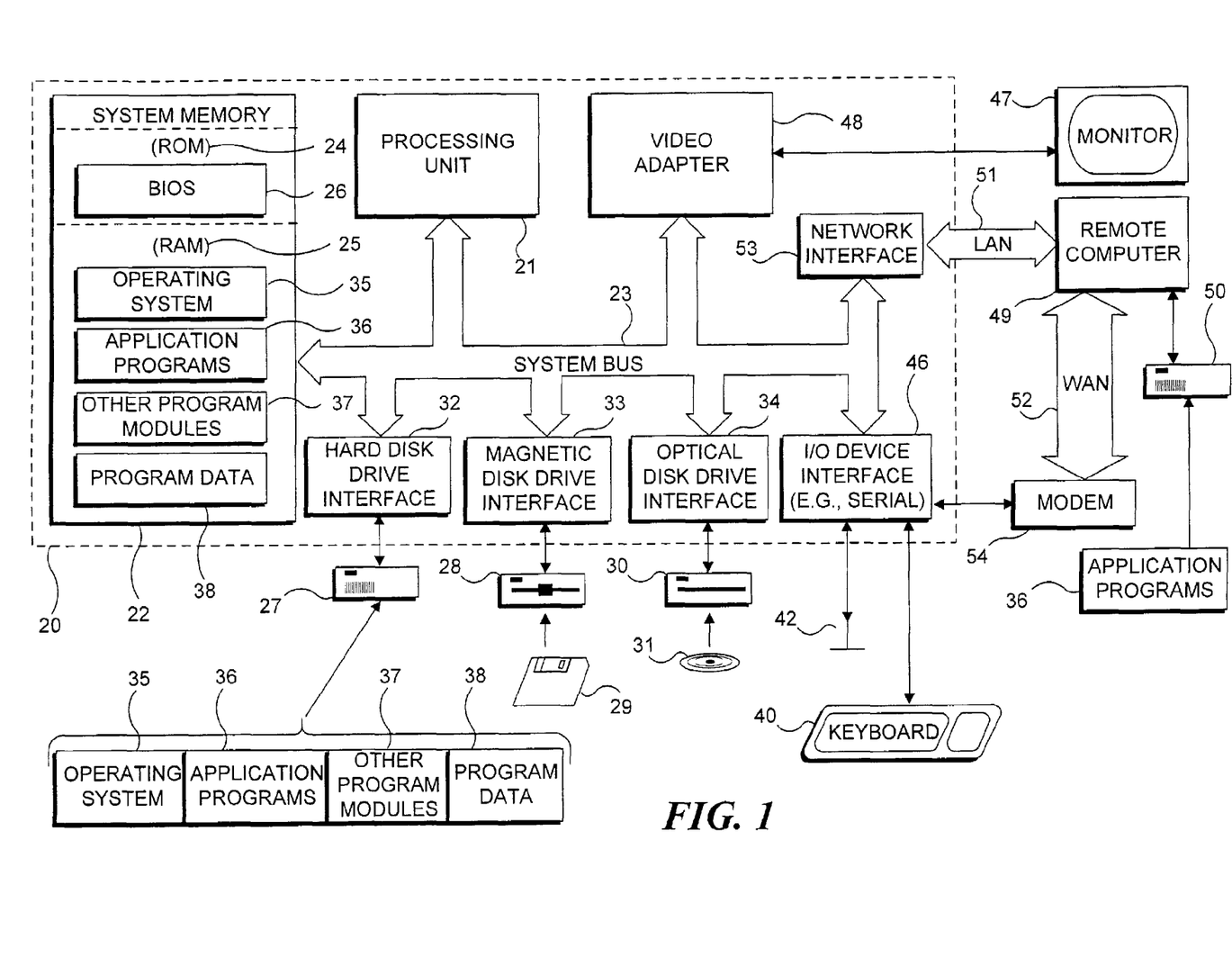
FIG. 1 is a functional block diagram of a general purpose computing device suitable for practicing the present invention.

With reference to FIG. 1, an exemplary general purpose computing device useful for implementing the present invention is illustrated in the form of a conventional PC 20. While the present invention was initially developed for use on Apple Corporation's MACINTOSH™ personal computers, it will be understood that the invention is generally applicable to almost any type of computing device, including, for example, personal data assistants (PDAs), mobile communication devices (e.g., cell phones), and other computing devices that include some user interface for interacting with a user. An initial preferred embodiment is implemented on a more general purpose computing device such as represented by PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention may be developed and practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a game console, a peer device, a satellite, or other common network node. Remote computer 49 may include many or all of the elements described above in connection with PC 20. So as not to make FIG. 1 unnecessarily complex, remote computer 49 is shown with only an external memory storage device 50. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Detecting Notifications and Alerts

A key component of the present invention is the central notification manager, which provides a central notification user interface. The central notification manager is a software application that is started when needed to display a notification or an alert to the user. In a preferred embodiment, the central notification manager is installed as part of Microsoft Corporation's OFFICE™ applications program suite, Version 10, for the MACINTOSH™ computer system. However, it is contemplated that the present invention could also be implemented on IBM compatible and other types of computing devices and under other types of operating systems, including Microsoft Corporation's WINDOWS™ operating system. Accordingly, it is not intended that the present invention in anyway be limited to its initial application for use on Apple Corporation's MACINTOSH™ computer and operating system.

Figure 2:
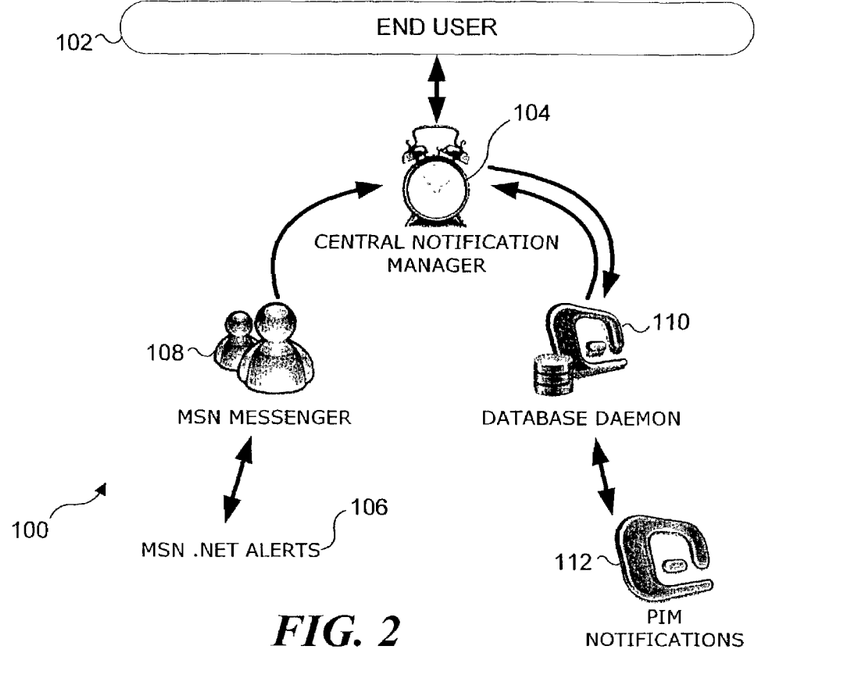
FIG. 2 is a high level schematic functional diagram illustrating how notifications and alerts are handled by a central notification manager in accord with the present invention.

As illustrated in FIG. 2, a block diagram 100 indicates that there are generally two paths to reach a central notification manager 104, where each path corresponds to a distinctly different type of notifications and alerts. Certain types of notifications and alerts are deemed to be of relatively limited temporal value, since they indicate current traffic conditions, current stock prices, and other information that is likely to change relatively rapidly so that a user would probably not care to view the alerts for more than one day. In FIG. 2, Microsoft .NET™ alerts 106 are of this type and are typically transmitted to an MSN MESSENGER application 108 that is executed on the user's PC. Although MSN MESSENGER 108 is normally installed to enable the user to chat with others who have MSN MESSENGER application installed on their PC or computing device, this messaging application includes a number of options that can be selectively set by the user to personalize the MSN™ messaging service. For example, a user may selectively enable traffic alerts to indicate the traffic conditions within a region in which the user commutes to and from work and can set stock alerts for a selected stock. MSN MESSENGER 108 detects the installation and operational status of central notification manager 104 on the user's computer. If central notification manager 104 is installed but not running, MSN MESSENGER 108 starts the central notification manager and transfers the Microsoft .NET alert 106 to the central notification manager so that the Microsoft .NET alert can be handled by the central notification manager instead of by the MSN MESSENGER application pop-up service. As an alert is detected, the central notification manager opens the alert on the screen in the central notification manager user interface, unless the user has chosen to block the alert from being displayed, for example, because the user's PC is running a presentation. Each .NET alert 106 is added to the list of alerts that is displayed when the user chooses to view all of the notifications and alerts that are currently pending or active.

Other types of notifications 112 such as reminders of tasks or events created, for example, in a personal information management program, are input to a database daemon 110, which provides a record in the database for each such notification and makes the database available to central notification manager 104 to produce a reminder to the user in the display of the user's PC. Records in this database are included in the list of current notifications and alerts that can be accessed and viewed by a user 102 within the central notifications user interface. As will be explained in greater detail below, other types of notifications can be produced by various business application programs such as those running under Microsoft Corporation's OFFICE™ suite of business applications, Version 10. It should again be noted that in a current preferred embodiment, database daemon 110 does not maintain any records in the database for the .NET alerts 106 conveyed through MSN MESSENGER 108. Instead, only notifications and alerts having a longer time value are included within the database maintained by database daemon 110. However, it is contemplated that a stored of all or of some other desired selection of notifications and alerts might be maintained in accord with the present invention. In either case, central notification manager 104 has access to the notifications and alerts received by the PC of the user. The OFFICE™ business application programs that are installed on the PC of the user can be a source of notifications presented to the user on the display and there is no provision for the business application programs to independently display such notifications in a current preferred embodiment.

Figure 3A:
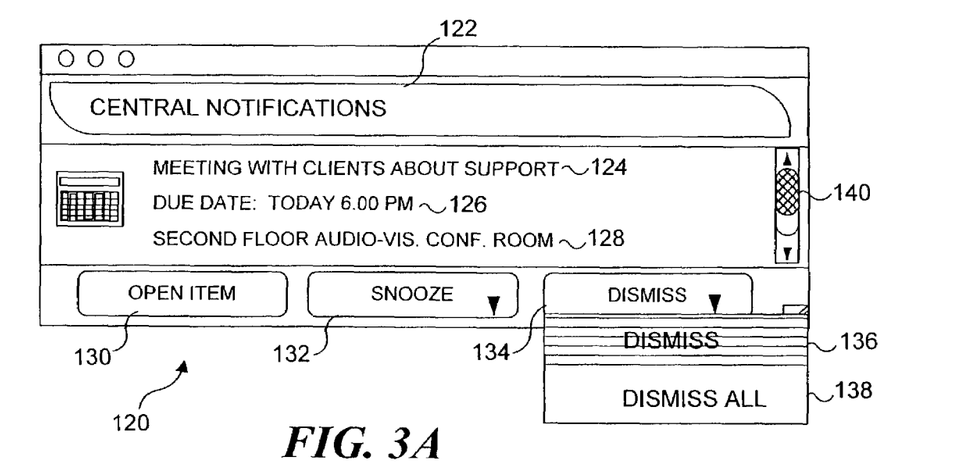
FIG. 3A is an exemplary user interface illustrating a notification for a meeting and showing the options for dismissing such notifications.

FIG. 3A illustrates an exemplary central notification manager user interface 120 that pops open for display on the user's monitor or other display (not shown). In this example, a reminder is presented relating to a scheduled notification produced by ENTOURAGE™, which is the Microsoft Corporation's combination email and personal information manager for the MACINTOSH computer, included in the OFFICE™ business productivity suite of programs, Version 10. A similar software product provided by Microsoft Corporation for use on the IBM PC compatible computer and under the WINDOWS™ operating system is Microsoft Corporation's OUTLOOK™ combined email and personal information manager program. User interface 120 is designed to be non-intrusive and to pop-up on the display screen without stealing the focus from another application in which the user is currently working. A title bar 122 indicates that the current notification is generated by one of the OFFICE™ software programs. In this example, a line 124 provides a reminder that the user has scheduled a meeting in regard to "client support." A line 126 indicates that the meeting is to take place "Today" at 6:00 PM, while a line 128 indicates that the meeting will be held in a second floor audio-visual conference room. In addition, for this type of notification, the user can select one of three different control buttons including an Open Item control button 130, a Snooze control button 132, and a Dismiss control button 134. As shown in FIG. 3A, the user has tentatively selected Dismiss control button 134, and as a result, two options including a "Dismiss" option 136 and a "Dismiss All" button 138 are displayed. Dismiss option 136 is highlighted, indicating that it is currently selected. Should the user click on the mouse select button, the indicated notification will be dismissed from the screen and its corresponding record will be removed from the database maintained by the database daemon. Other notifications may be accessed by moving a cursor 140 in the conventional manner.

Figure 3B:
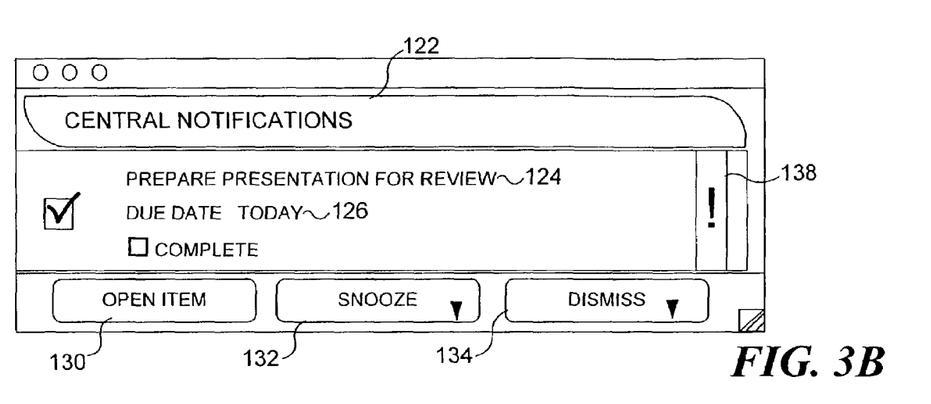
FIG. 3B is an exemplary user interface pop-up for a notification of a task having high priority.

In FIG. 3B, central notifications user interface 120 illustrates how a task on line 124 is identified as having a high priority. To provide the indication of high priority, the central notifications user interface includes an exclamation mark 138, ensuring that the user is aware that this task is of high importance and should not be ignored.

When central notifications user interface 120 opens on the user's display screen, the focus does not shift to the central notifications user interface until the user clicks on one of the options displayed therein. Accordingly, the user will not be unduly interrupted by the pop-up display of the central notifications user interface, but instead, can continue working within the application in which the user was working prior to the pop-up display of the central notifications user interface. Generally, the central notifications user interface will have the highest Z-order (i.e., stacking order of displayed windows) in regard to other elements on the display screen so that it appears above other elements, including the dock (or taskbar), but it can readily be shifted to a portion of the display in which it does not obscure other applications.

It should be noted that open item control 130 and snooze control 132 are not displayed when a .NET alert is presented to a user, since they are not applicable to such alerts. Only dismiss control 134 is active for .NET alerts. The user has the option of selectively enabling "auto size" for automatically sizing the central notifications user interface window based on the number of items listed, or alternatively, can selectively manually modify the size in a conventional manner. The vertical size of the central notifications user interface can only be adjusted manually by increments corresponding to a predefined size for each alert or notification. If the auto size option is chosen, when additional notifications and alerts are added to the user interface list, the user interface list automatically expands upwardly to accommodate the additional notifications and alerts, until the top of the user interface reaches the top of the display screen. If there is insufficient room to display all of the notifications and alerts on the screen, any that are not currently displayed can be accessed using scroll bar 140. Control buttons 130, 132, and 134 are always centered within the lower portion of the user interface, regardless of the width of the user interface that is automatically set, or manually set by the user.

Figure 4:
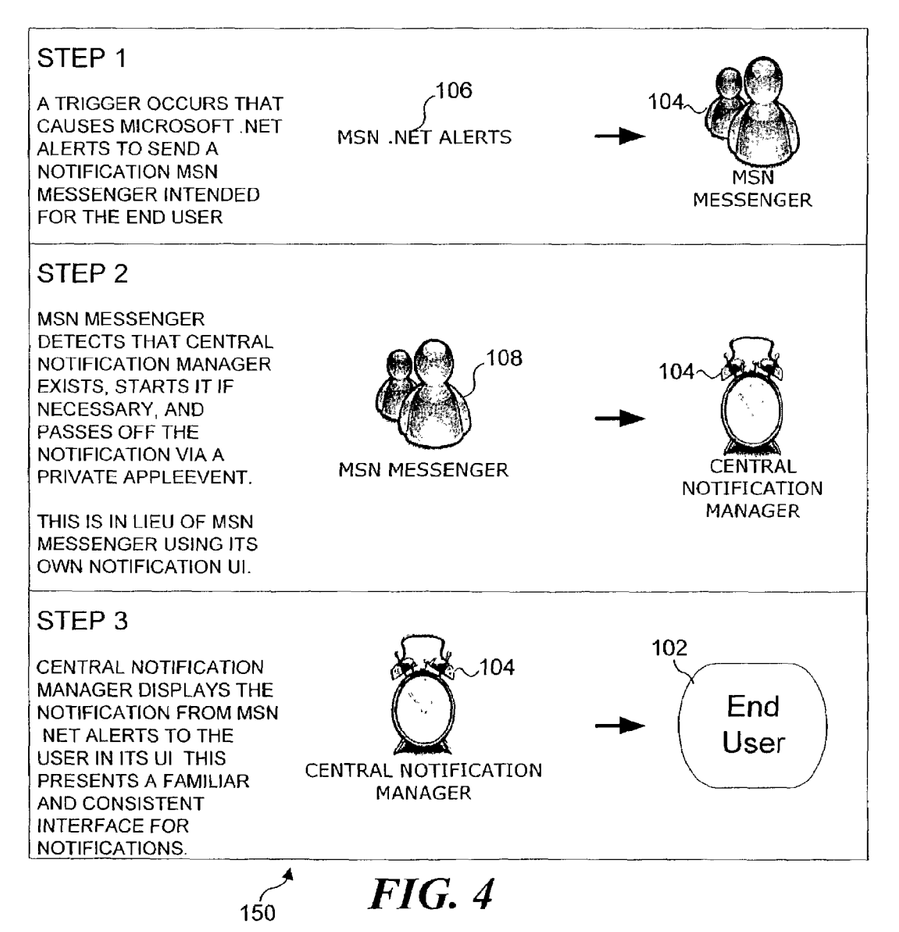
FIG. 4 is a schematic diagram illustrating an overview of the steps for displaying a notification of an MSN MESSENGER™ .NET™ alert to a user with the central notification manager.

A schematic diagram 150 in FIG. 4 illustrates the three steps that are implemented in response to a .NET alert 106 being received by the user's PC. In the first step, a trigger such as a change in stock price or a traffic alert occurs, causing the messaging service to send a notification that is intended for the end user, via MSN MESSENGER 108. When the central notification manager user interface is installed but is not running on the user's computer, the MSN MESSENGER™ service application will start the central notification manager application. Only if the central notification manager application is not installed on the user's PC, will MSN MESSENGER™ handle the receipt of the Microsoft .NET™ alert directly. If, as shown in step 2, MSN MESSENGER™ detects that the central notification manager exists, MSN MESSENGER passes off the notification of the alert through a private AppleEvent. The alert that is conveyed by MSN MESSENGER 108 is received by central notification manager 104. In the third step, the central notification manager displays the alert that has been received to user 102 in the central notification user interface. Since the .NET alert conforms to the same format as all of the other notifications and alerts that are displayed, the user is provided with a familiar and consistent interface in which to receive, view, and manage each notification and alert, regardless of the source.

Figure 5A:
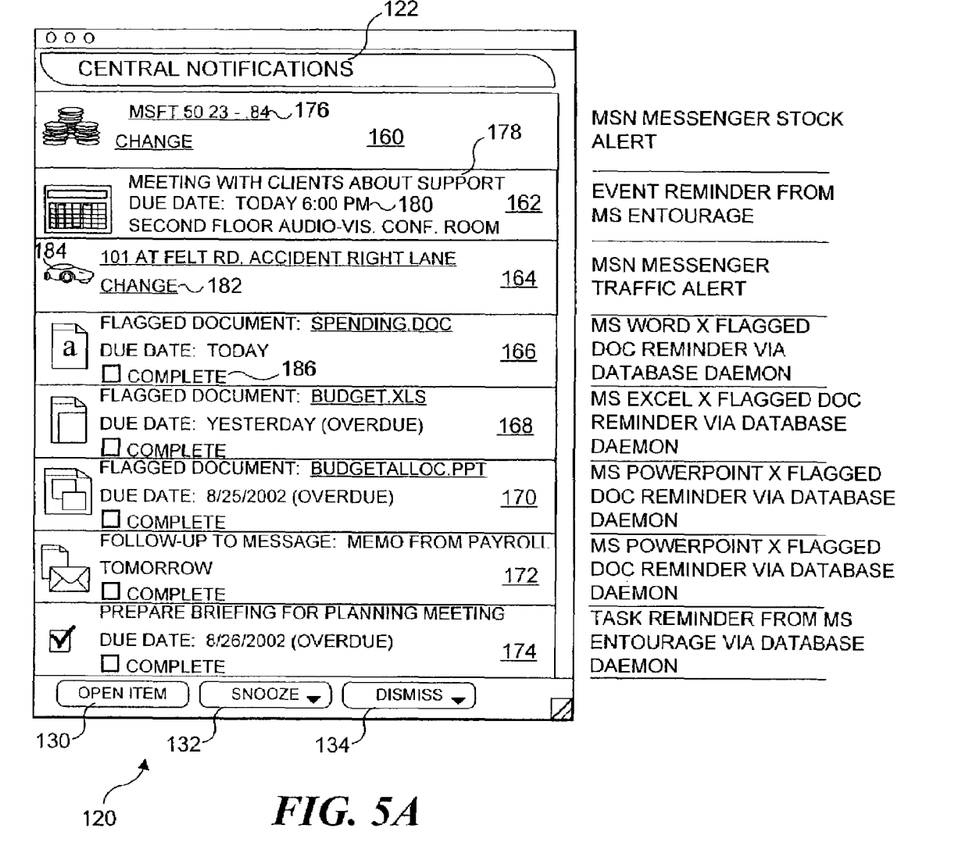
FIG. 5A is an exemplary user interface illustrating several different types of notifications and alerts as provided by the central notification manager.

Exemplary central notifications user interface 120 is shown in FIG. 5A, with a plurality of different notifications and alerts displayed for review by the user. Specifically, notifications and alerts 160 through 174 are illustrated as exemplary of the types of notifications and alerts that would typically be displayed to a user in the central notification manager user interface. Adjacent to the central notifications user interface are descriptions identifying the particular alert or notification that appears in the user interface to the immediate left. For example, the description for alert 160 indicates that the current price and change in price for a stock appearing in a line 176 has been received from MSN MESSENGER as a stock price alert. An event reminder comprising notification 162 indicates that the user is to meet with clients about support as noted in a line 178, and that the meeting is scheduled for Today at 6:00 PM, as indicated in a line 180. Also shown is the location of the meeting. It should be noted that the central notification manager preferably indicates the date of an event using the relative terms "yesterday," "today," and "tomorrow." As shown in alert 164, clicking on the word "Change" in a line 182 passes a uniform resource locator (URL) to a browser program, such as Microsoft Corporation's INTERNET EXPLORER™, which opens an appropriate web page to enable the user to make changes in (i.e., edit) the preferences for MSN MESSENGER affecting the traffic alerts that will be received.

Each of the different types of notifications and alerts shown in the user interface are associated with a distinctive graphic icon. For example, an icon 184 representing a vehicle is preferably used by the server that provides the alert to indicate that the related alert corresponds to a traffic condition to be displayed for MSN MESSENGER service. The other graphic icons shown in FIG. 5A correspond to other types of or sources of notifications and alerts.

Another type of notification is provided as a result of a user flagging a document and associating a due date in which an action regarding the document is required. Notification 166 is thus associated with a word processing document entitled "SPENDING.DOC." Once the user has completed the required action for the document, a check box in a line 186 can be checked, indicating completion of the action. Other types of business productivity application files that can be associated with actions include a spreadsheet document as shown in notification 168 and presentation documents as shown in notifications 170 and 172. In addition, reminders of tasks, such as that in notification 174, can be included in the list displayed to a user by central notifications user interface 120. Such tasks are created by the user using the email/personal information management program, such as Microsoft Corporation's ENTOURAGE. If the present invention is implemented on a PC running one of Microsoft Corporations' WINDOWS™ operating systems, tasks might be created using Microsoft Corporation's OUTLOOK™ email/personal information management program.

Figure 5B:
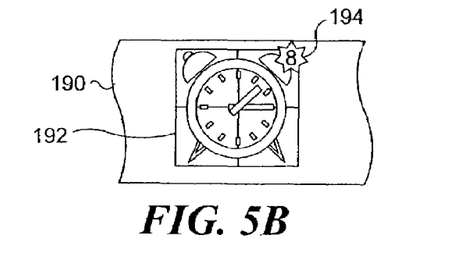
FIG. 5B is an exemplary icon that appears in the dock or taskbar while the central notification manager is running and which shows a count of the number of notifications and alerts that are currently active.

While the central notifications manager application is running, an icon 192 is provided in a dock (or taskbar) 190, as shown in FIG. 5B. Associated with icon 192 is a count 194 of the number of active notifications and alerts that can be accessed if the user opens the central notifications user interface. Count 194 changes as the user dismisses an alert or notification, which decrements the count by one, and increases as an additional alert or notification is added to the database maintained by the database daemon.

Figure 6:
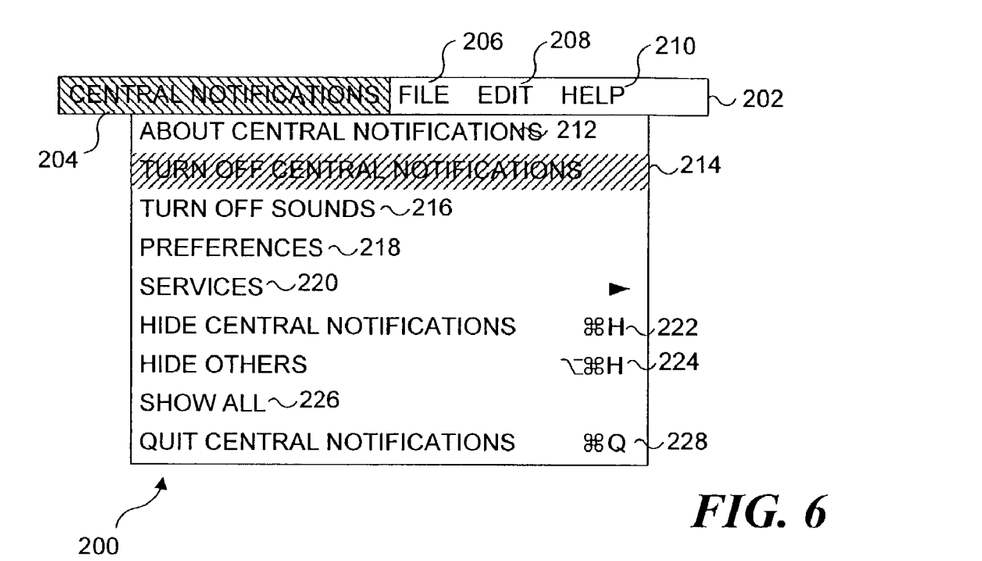
FIG. 6 is an exemplary user interface showing options that can be selectively set by a user to control the functionality of the central notification manager.

In FIG. 6, a drop down menu 200 is displayed when the user selects a central notifications item 204 from a menu line 202. Other generally conventional menu items that are provided by the operating system include a file menu 206, an edit menu 208, and a help menu 210. When central notifications menu 204 is selected, the list shown in FIG. 6 drops down, enabling the user to select from any of the options in lines 212 through 228. Currently, line 214 is highlighted to indicate that a user has selected the option to turn off the central notifications.

Other options include turning off the sounds in line 216 (e.g., the sound produced when a reminder of a task or other notification pops up on the display), opening a preferences dialog 218, opening a services menu 220, hiding central notifications 222, hiding other notifications in line 224, showing all of the notifications and alerts in a line 226, and quitting central notifications in a line 228, which also closes the icon 192.

Figure 7:
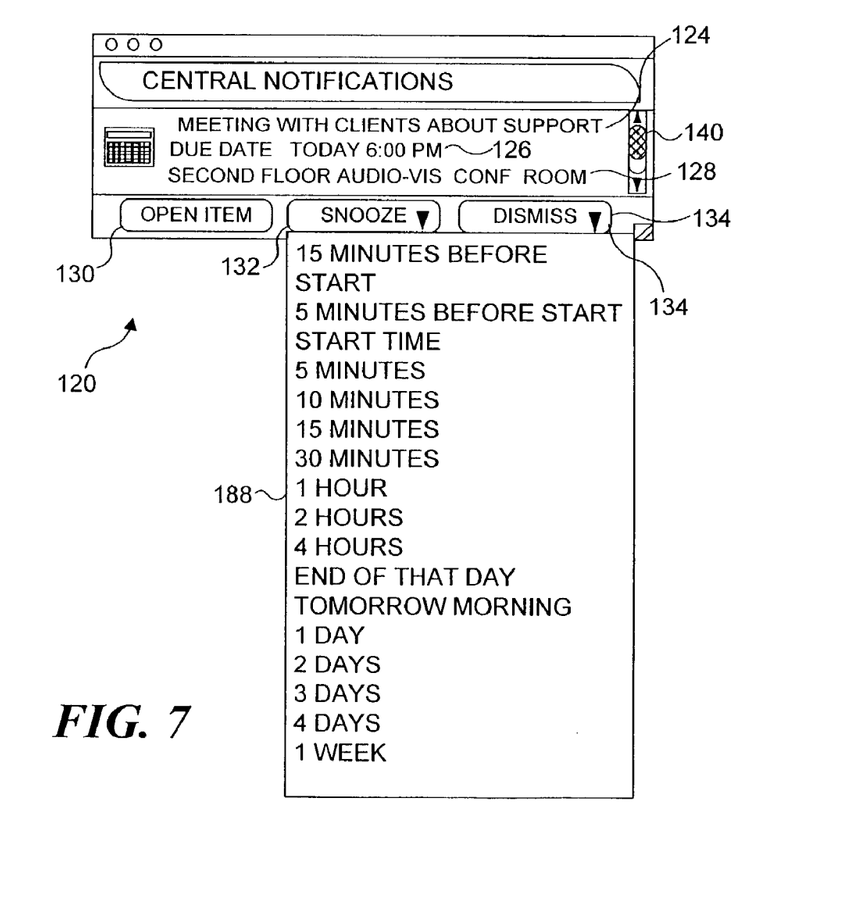
FIG. 7 is the exemplary user interface of FIG. 3A, showing snooze options for delaying a response to a notification.

For notifications or tasks that are to be performed by a particular date and time, the user can select snooze control button 132 to defer the reminder to a later date/time. FIG. 7 illustrates menu options 188 that are displayed if snooze control button 132 is selected.

Figure 8A:
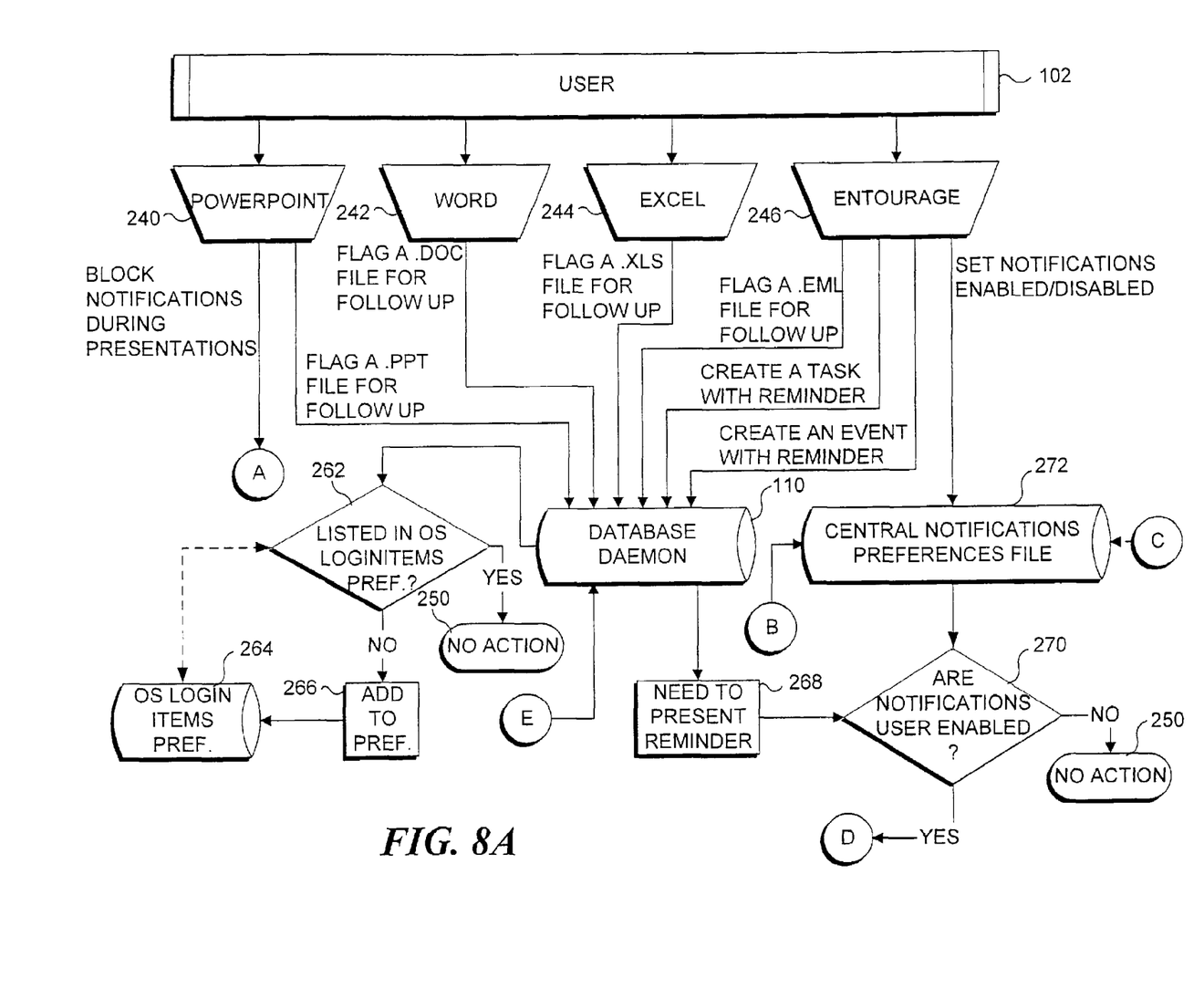
FIGS. 8A, 8B, and 8C together illustrate details of the logical steps implemented in carrying out the present invention.
Figure 8B:
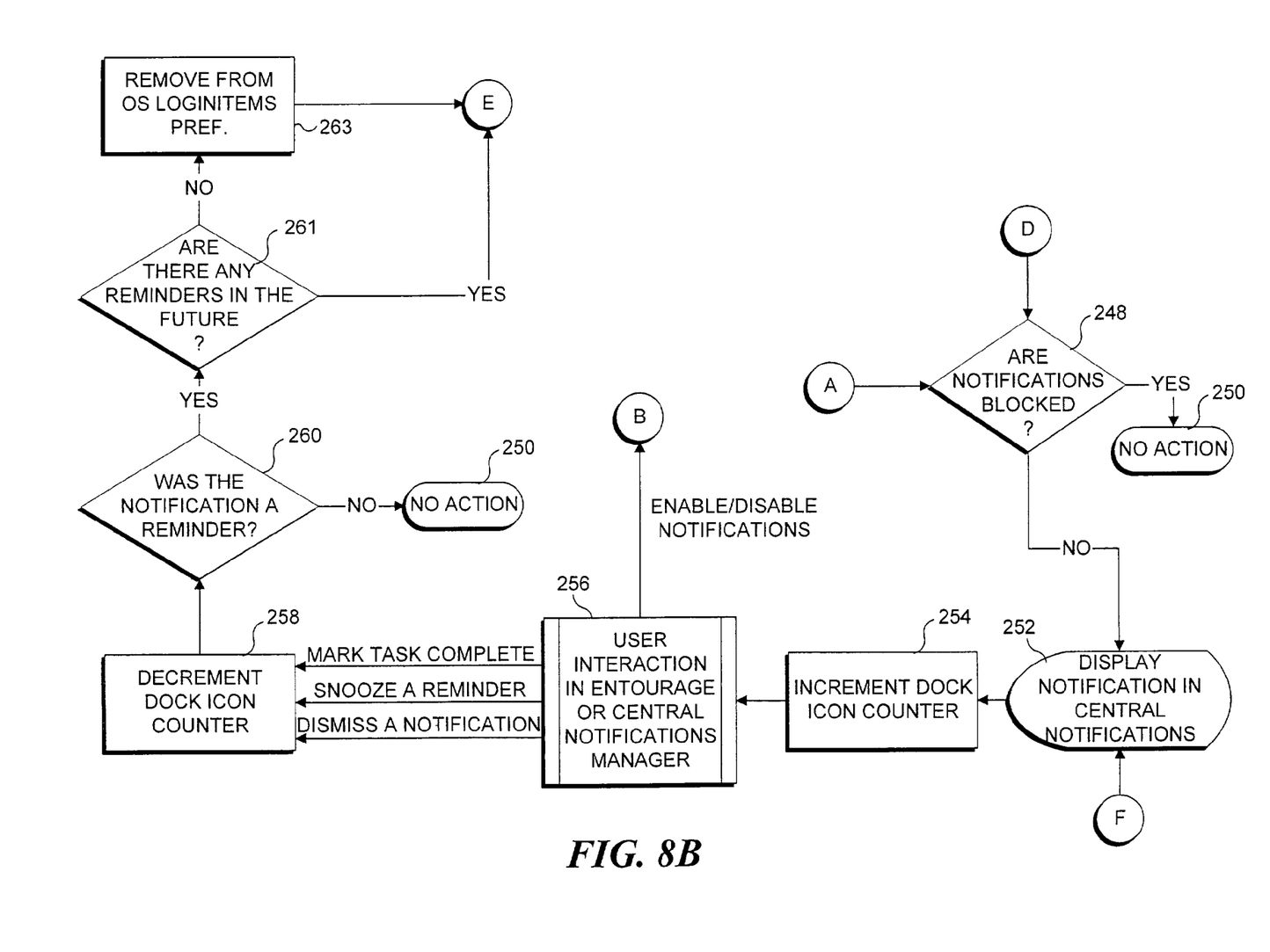
Figure 8C:
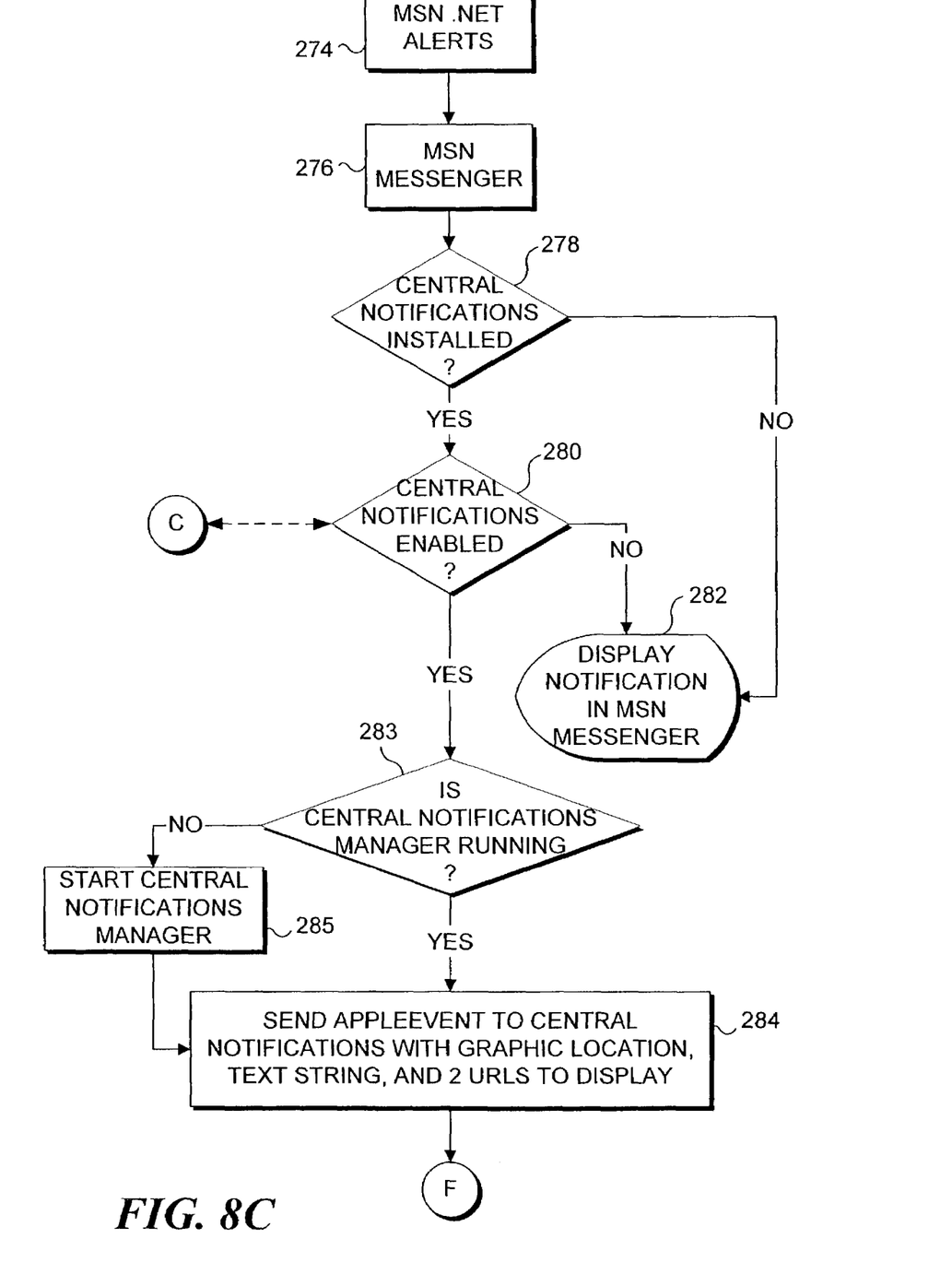

FIGS. 8A, 8B, and 8C together illustrate the logical steps carried out in implementing a preferred embodiment of the present invention. As noted above, notifications and alerts derive from two distinctly different types of sources in a preferred embodiment of the present invention. In FIG. 8A, user 102 interacts with any of a number of business productivity application programs. In this embodiment, a suite of business productivity applications, such as those in Microsoft Corporation's OFFICE™ product, which includes POWERPOINT™ 240, WORD™ 242, EXCEL™ 244, and ENTOURAGE™ 246 (or OUTLOOK in the IBM PC compatible version) are shown. Each of the POWERPOINT, WORD, and EXCEL application programs enable a user to flag a file produced by the application for subsequent follow up by a user. For example, POWERPOINT produces presentation files having a .PPT extension, WORD produces documents having a .DOC extension, and EXCEL produces spreadsheet files having a .XLS extension, and each of these different types of files can be associated with a follow-up notification that reminds a user to take some action in regard to the file. Anytime the user 102 flags the specific file produced by one of these three application programs for subsequent follow up, the flag is stored by database daemon 110 in the database of notifications and alerts that can be viewed using the central notification user interface. Similarly, ENTOURAGE 246 can flag an email file for subsequent follow up and can also create a task having a reminder date and time, so that the user is notified on the date and time when the task is to be completed, and a user can create an event having an associated reminder such as a wedding anniversary or birthday that is scheduled to pop-up in the central notification user interface. Through ENTOURAGE, user 102 can selectively set the notifications to be either enabled or disabled and the selected setting is recorded in a central notification preferences file 272.

A decision step 262 determines if the database daemon has been listed in the operating system loginitems preferences 264, which is part of the operating system. Loginitems preferences are accessed to determine the appropriate response to this inquiry. If the database daemon is not included in the loginitems preferences, a block 266 provides for adding it to the preferences. But, if it is already included, a block 250 indicates that no action is taken in regard to this decision. Conversely, each time that a notification or alert is completed, dismissed, or deleted, the database daemon will check to see if there are any pending notifications, or alerts, and if not, the database daemon will remove itself from the loginitems preferences.

Database daemon 110, when active, is responsible for displaying notifications and alerts to remind the user of the dates and times entered into its database. When the database daemon determines that the current date and time corresponds to a date and time at which a notification or an alert should be displayed as a reminder to the user, as indicated in a box 268, a decision step 270 determines if the user has enabled notifications. This determination is made by checking central notifications preferences file 272. It will be recalled, that one of the options available to the user is enabling or disabling notifications altogether. Thus, if a user is working on a project that requires the user not to be interrupted by pop-up alerts or notifications on the display, the user can selectively disable such pop-ups from appearing by completely disabling all notifications and alerts. In decision block 270, if user has chosen to do so, step 250 provides for taking no action, even though the program would normally have provided a reminder to the user. Conversely, if notifications have not been disabled by the user, the logic proceeds to a decision step 248 (FIG. 8B) which determines if notifications have temporarily been blocked by another application. In this determination, another application may have blocked display of notifications and alerts. For example, a POWERPOINT 240 presentation (FIG. 8A) may temporarily have blocked notification and alerts from being displayed, since the display of the alert within a presentation would be an unwelcome distraction to others who are viewing it. If the notifications are not blocked, a step 252 provides for displaying the notification in the central notifications user interface. Further, since an additional alert or notification has been added to the displayed items in the user interface, a step 254 provides for incrementing the counter in the dock icon (shown in FIG. 5B).

At this point, as indicated in a step 256, user interaction can provide for a number of further actions. For example, the user may decide to enable or disable notifications by selecting the central notifications preferences and making an appropriate change to the preferences recorded in the file. Also, if the user has completed a task that is indicated by an active notification, the user can mark the task complete, removing it from the active list. Or, the user may elect to "snooze" a reminder by deferring further action on it for a selected period of time (for any selected interval shown in FIG. 7). Finally, the user may dismiss a notification if the user has no further interest in having it included in the display of notifications and alerts that are currently active.

Once a notification or alert has been marked as completed, or has been deferred to a later time by the user choosing to snooze it, or if it has been dismissed, a step 258 decrements the counter in the dock icon to show that one less notification or alert is currently active. A decision step 260 then determines if the notification was a reminder, and if not, no further action is taken, as indicated by step 250. Conversely, if the notification was a reminder, a decision step 261 determines if there are any further reminders scheduled to be displayed to the user in the future, and if not, a step 263 removes the daemon from the operating system loginitems preferences. Then, or if the determination in decision step 261 indicates that there are other reminders scheduled, the logic proceeds back to database daemon 110 (in FIG. 8A), which makes an appropriate correction to the database in regard to the specific action taken by the user.

FIG. 8C illustrates the other type of alerts or notifications, which arise from Microsoft .NET alerts, as indicated in a step 274. Any such alert that is received is handled by MSN MESSENGER, as indicated in a step 276. A decision step 278 determines if the central notifications has been installed on the user's PC. If so, a decision step 280 determines if the user has enabled notifications. If not, or if central notifications has not been installed, the alert that has been received and is being handled by MSN MESSENGER is then displayed by MSN MESSENGER in a step 282 rather than in the central notifications user interface. However, if the central notifications are enabled on the user's PC, a decision step 283 determines if the central notifications manager is running, and if so, a step 284 provides for sending an AppleEvent to the central notification manager, along with a pointer to a file that includes a graphic icon for use in the pop-up display, any appropriate text string, and up to two URLs related to the alert. One URL is for a web page that can be accessed with a browser program if the user clicks on the title of the notification or alert, and the other URL is for the web page that is loaded into the browser program if the user clicks on the "Change" button, to enable the user to modify preferences for a notification or an alert. If the central notifications manager is not running in decision step 283, a step 285 provides for starting the central notifications manager, and the logic then continues with step 284, as, discussed above. The logic then proceeds with decision step 248 (shown in FIG. 8B), which displays the notification to the user.

Although the present invention has been described in connection with the preferred form of practicing it and modifications thereto, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for centrally coordinating and presenting notifications and alerts to a user of a computing device in a uniform and consistent format, where said notifications and alerts can originate from any of a plurality of different sources, said method comprising acts of:
   (a) receiving a notification or alert from one of the plurality of different sources;
   (b) as a result of receiving the notification or alert, detecting that a central notification manager is installed but not running, and as a result of detecting that a central notification manager is installed but not running, starting the central notification manager;
   (c) determining that the received notification or alert has a long temporal value and as a result of determining that received notification or alert has a long temporal value, storing the notification or alert with a long temporal value in a database accessible by a central notification manager, wherein the notification or alert with a long temporal value is generated by at least one of a personal information management program or a business productivity software application, and is not generated or received by a messenger service program, and not storing received notifications or alerts that have a limited temporal value, received by a messenger service program in the database accessible by the central notification manager;
   (d) displaying an indication of the notification or alert at the central notification manager; and
   (e) displaying, at the central notification manager, an indication of subsequent notifications or alerts received from the plurality of different sources.

2. The method of claim 1, wherein the notifications and alerts that are stored in the database comprise a follow-up event associated with a file produced using said at least one business productivity software application.

3. The method of claim 1, further comprising an act of automatically blocking notifications and alerts from being displayed to the user in response to a presentation software application displaying a presentation on the computing device.

4. The method of claim 1, wherein at least one source of the notifications and alerts comprises a messaging service that is coupled to the computing device over a network, the method further comprising an act of receiving notifications and alerts over the network from another site, the notifications comprising at least one of a stock price alert or a traffic alert.

5. The method of claim 1, further comprising an act of enabling the user to selectively enable display of notifications and alerts by the central notification manager user interface.

6. The method of claim 1, further comprising acts of:
   (a) counting the notifications and alerts that have been detected and are still active to produce a count;
   (b) decrementing the count in response to one of:
      (i) expiration of one of a notification or an alert; and
      (ii) deletion of one of a notification or an alert by the user; and
   (c) displaying the count to the user.

7. The method of claim 1, further comprising an act of enabling the user to defer a notification or an alert for a selected snooze time interval after the notification or alert has been displayed to the user.

8. The method of claim 1, further comprising an act of indicating at the central notification manager a status of notifications or alerts that are associated with at least one of a specific date and a specific time.

9. The method of claim 8, wherein the status specifies whether said one of the specific date and the specific time has already passed.

10. A physical computer readable storage medium storing computer readable machine instructions for implementing the acts of claim 1.

11. A system for centrally coordinating and presenting notifications and alerts to a user in a uniform and consistent format, where said notifications and alerts can originate from any of a plurality of different sources, comprising:
   (a) a display;
   (b) a user input device;
   (c) a memory in which machine instructions are stored; and
   (d) a processor coupled to the display, the user input device, and the memory, said processor executing the machine instructions to carry out a plurality of functions, including:
      (i) receiving a notification or alert from one of the plurality of different sources;
      (ii) as a result of receiving the notification or alert, detecting that a central notification manager is installed but not running, and as a result of detecting that a central notification manager is installed but not running, starting the central notification manager;
      (iii) determining that the received notification or alert has a long temporal value and as a result of determining that received notification or alert has a long temporal value, storing the notification or alert with a long temporal value in a database accessible by a central notification manager, wherein the notification or alert with a long temporal value is generated by at least one of a personal information management program or a business productivity software application, and is not generated or received by a messenger service program that receives alerts over a network, and not storing received notifications or alerts that have a limited temporal value, received by a messenger service program in the database accessible by the central notification manager;
      (iv) displaying an indication of the notification or alert at the central notification manager; and
      (v) displaying, at the central notification manager, an indication of subsequent notifications or alerts received from the plurality of different sources.

12. The system of claim 11, wherein the notifications and alerts stored in the database comprise a follow-up event associated with a file produced using said at least one business productivity software application.

13. The system of claim 11, wherein the machine instructions further cause the processor to automatically block notifications and alerts from being displayed on the display in response to a presentation software application displaying a presentation.

14. The system of claim 11, further comprising a network interface that is adapted to couple the processor to a network, wherein at least one source of the notifications and alerts comprises a messaging service that is coupled to the processor through the network interface, and wherein the machine instructions further cause the processor to receive the notifications and alerts over the network from another site.

15. The system of claim 11, wherein the machine instructions further cause the processor to enable a user to selectively disable display of notifications and alerts on the display with the central notification manager user interface.

16. The system of claim 11, wherein the machine instructions further cause the processor to:
   (a) count the notifications and alerts that have been detected and are still active, producing a count;
   (b) decrement the count in response to one of:
      (i) an expiration of one of a notification or an alert; and
      (ii) deletion of one of a notification or an alert by a user; and
   (c) display the count to a user on the display.

17. The system of claim 11, wherein the machine instructions further cause the processor to enable a user to defer one of the notifications and the alerts for a selected snooze time interval after said one of the notifications and the alerts has been displayed.

18. The system of claim 11, wherein the machine instructions further cause the processor to indicate at the notification manager a status of notifications and alerts that are associated with at least one of a specific date and a specific time.

19. The system of claim 18, wherein the status specifies whether said one of the specific date and the specific time has already passed.

20. The method of claim 1, wherein the act of starting a central notification manager is performed by an application to which the notification or alert is directed and is performed in response to the application receiving the notification or alert, the method further comprising transferring the notification or alert to the central notification manager.

21. The system of claim 11, further comprising a software application to which the notification or alert is directed, wherein starting a central notification manager is performed by the software application to which the notification or alert is directed and is performed in response to the software application receiving the notification or alert, the processor further configured to transfer the notification or alert to the central notification manager.

22. The method of claim 8, wherein the status is specified using relative terms including at least one of yesterday, today or tomorrow.

* * * * *